A. LUDWIG
Aug. 26, 1930. ILLUMINATED STAR Re. 17,777
Original Filed May 7, 1925
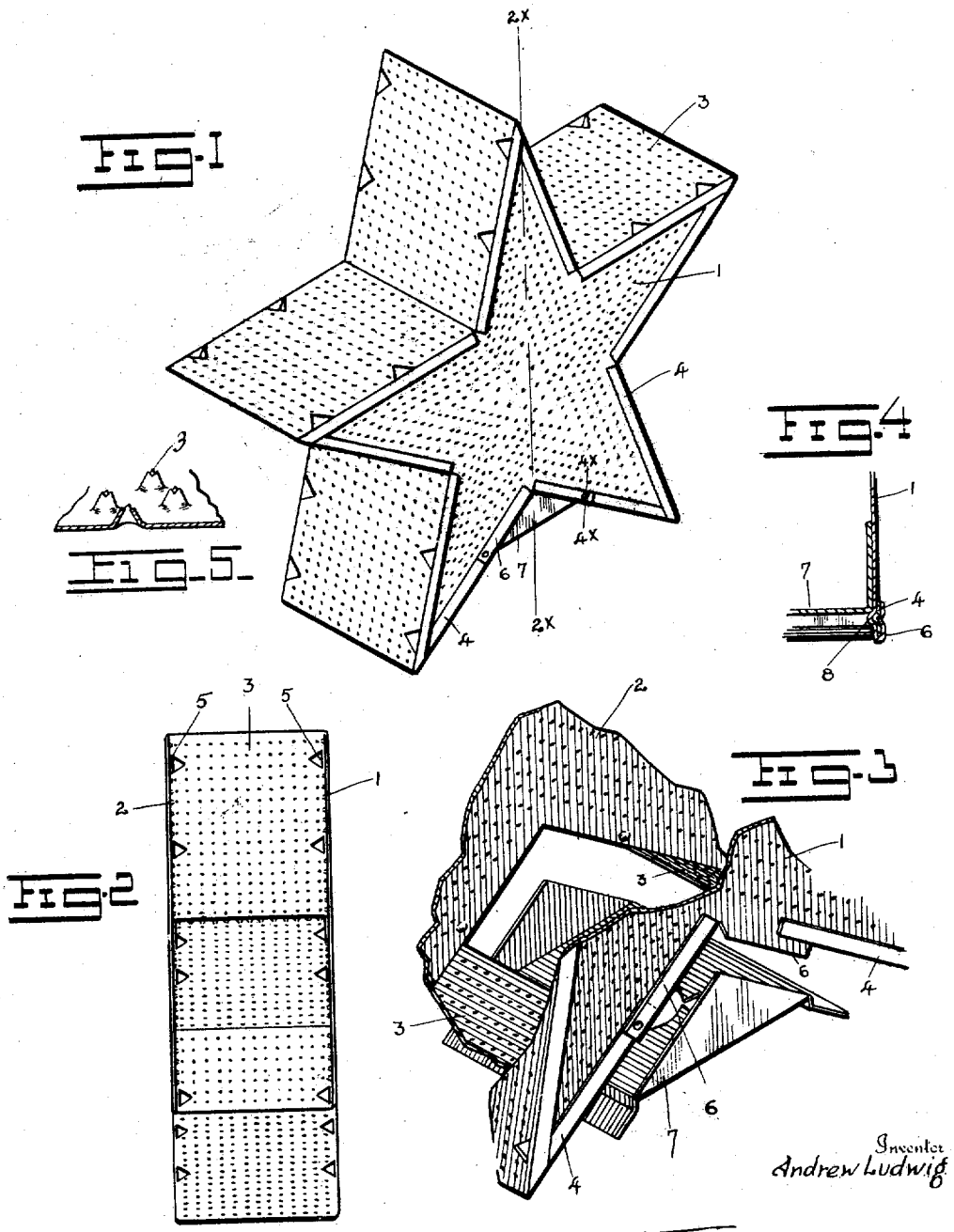
Inventor
Andrew Ludwig
By Frank Kiper.
Attorney Reissued Aug. 26, 1930 Re. 17,777

UNITED STATES PATENT OFFICE

ANDREW LUDWIG, OF ROCHESTER, NEW YORK, ASSIGNOR TO DEAL ELECTRIC CO., INC., OF NEW YORK, N. Y., A CORPORATION OF NEW YORK

ILLUMINATED STAR

Original No. 1,589,018, dated June 15, 1926, Serial No. 28,673, filed May 7, 1925. Application for reissue filed June 1, 1928. Serial No. 282,146.

The object of this invention is to provide a star made up of sheet metal to be illuminated from the inside for use as an ornament for a Christmas tree, wreath or other display.

Another object of the invention is to make this star so that it can be constructed cheaply and readily attached to the tree or any other suitable point or mounted on a standard.

These and other objects will be illustrated in the drawing, described in the specification and pointed out in the claims at the end thereof.

In the accompanying drawing—

Figure 1 is a perspective view of the star.

Figure 2 is a vertical cross-section of the star, the section being taken on the line $2^x$—$2^x$ of Figure 1.

Figure 3 is an enlarged detail perspective view of the lower portion of the star illustrating the locking means with which the parts of the star are held together.

Figure 4 is an enlarged section through the locking means, the section being taken on the line $4^x$—$4^x$ of Figure 1.

Figure 5 is an enlarged detail perspective of some of the depressions formed in the casing of the star.

In the several figures of the drawing, like reference numerals indicate like parts.

The illuminated star forming the subject matter of my present invention is an improvement of the illuminated star illustrated and described in my prior Patent 1,410,336, issued to me March 21, 1922. The improvement consists chiefly in making the star entirely out of metal and locking the parts of the star together with a simple but very effective locking means. To make the metal transparent it is perforated at the front, back and sides, but in making these perforations the metal is not punched out but is simply depressed into the inside of the star forming series of small depressions having a small opening in the center thereof.

The body portion of the star as illustrated in the figure is made up in three parts, the front panel 1, rear panel 2, and sides made up of a continuous strip of metal or metal band that is attached to the front and rear panel to complete the star. For this purpose the metal band 3 is provided with the flanges 4, 4, at each side thereof and these flanges are adapted to be bent down on the outside of the front and rear panel. The metal band 3 is also provided with a series of small triangular flanges 5, 5, that are punched out and bent down near the edges of the metal band. These flanges are bent down first and form stops or lugs against which the front panel 1 and rear panel are placed, the triangular flanges thus bear against the inner side of the front and rear panels. When the triangular flanges are in place, the flanges 4, 4 are bent down over the outside of the front and rear panel of the star to hold them in place against the triangular flanges 5, 5.

As illustrated in detail in Fig. 3, the metal band 3 is attached to the front 1 and back 2 of the star by extending the flanges 4 a short distance beyond the ends of the metal band 3, and then bending up the flanges 6, 6 provided on the underside of the front panel 1 and rear panel 2. These flanges of the front and rear panel thus hold the projecting ends of the flanges 4 in place and prevent the metal band 3 forming the sides of the star from disengaging itself from the periphery of the star shaped front and rear panel.

For the purpose of further locking the extending flanges 4 of the metal band to the flanges 6 of the front and back of the star a lug 8 is struck up through the flanges 4 and 6 as illustrated in detail in Figure 4. By doing this these flanges are interlocked and need not be soldered together to prevent their disengagement from each other.

The lug 8 thus formed serves an additional purpose, namely means for locking the supporting base 7 of the incandescent lamp supported within the star. This base is bent up in the shape illustrated in detail in Fig. 3 and is adapted to fit into the opening left between the ends of the metal band 3 at the bottom of the star. The lugs 8 struck up to interlock the flanges 4 and 6 together project into this opening so that when the base 7 is forced into the opening of the star, these lugs spring under the bottom of the base and hold the base in place in the opening in the bottom of the star.

As above pointed out the front, back and sides of the star are perforated by forcing the metal into the inside so as to form depressions leaving but a small hole in the bottom of the depressions. The perforations thus formed provide a series of small reflecting cone shaped lugs on the inside of the star which when illuminated by the incandescent lamp supported within the star reflect the light rays in all directions which adds to the illuminating effect of the star. The fact that the perforations of the star are at the inner end of the depressions and are very small prevents the incandescent light mounted within the star to be observed from the outside except when looking directly into the perforations. The outside of the star may be given a dull finish but the inside of it is provided with a bright reflecting finish.

I claim:

1. An illuminated star comprising a front panel, a rear panel, a band encircling the perimeter of said front and rear panel, a flange extending from the ends of said band and a flange bent up from said front and rear panel and clamped over said flange extending from said band to lock the ends of said band to said front and rear panel, and hold said band in place around the perimeter of said front and rear panel.

2. An illuminated star comprising a front panel, a rear panel, a band encircling the perimeter of said front and rear panel, a flange extending from the ends of said band and a flange bent up from said front and rear panel and clamped over said flange extending from said band to lock the ends of said band to said front and rear panel and hold said band in place around the perimeter of said front and rear panel, a lug struck up thru said flanges of said front and rear panel and said extending flanges of said band to interlock said flanges with each other, a supporting base adapted to engage between the ends of said band said lugs being adapted to engage under said supporting base and hold said base in place between the ends of said band and between said front and rear panel.

3. An illuminated star comprising a front and rear panel, a band encircling the perimeter of said front and rear panel and holding them parallel to each other, with a suitable space between them, a light mounted between said front and rear panel, depressions having small openings in the center thereof provided in said front and rear panel, said depressions forming raised conical deflecting surfaces on the inside of the star, each of said raised conical deflecting surfaces diffusing the light rays in all directions within the star.

4. An illuminating device comprising a star-shaped body of three pieces of sheet metal, each of said pieces being perforated to transmit light, said pieces having interconnecting portions for holding each other in rigid relation without the use of any binding agent.

5. An illuminating device comprising a flexible, metal body having two parallel illuminating surfaces, a member for spacing said parallel surfaces, said member providing an additional illuminating surface and having means integral with said body portions for rigidly retaining said parallel surfaces in fixed relation to each other.

6. An illuminating device comprising an all-metallic body having two parallel illuminating surfaces, a member for spacing said parallel surfaces, substantially every portion of said body being perforated, said body having integral means for rigidly retaining said parallel surfaces in fixed relation to each other.

7. An illuminating device comprising a star-shaped body having two parallel illuminating surfaces, a member for spacing said parallel surfaces, said member providing an additional illuminating surface and having an integral extension for rigidly retaining said parallel surfaces in fixed relation to each other.

8. An illuminating device comprising in combination, a star shaped globe made of opaque sheet material and means for mounting an illuminant within said globe, said globe being adapted to completely enclose said illuminant and formed with inward depressions having small openings in the center thereof, said depressions forming raised reflecting surfaces on the inside of the star, whereby the interior of said globe may not be observed by persons looking at the device from the outside thereof.

9. An illuminating device comprising a lamp globe, a lamp within said globe and completely enclosed thereby, said globe being made of sheet material formed with inward depressions having small openings in the center thereof, said depressions forming raised conical reflecting surfaces on the inside of the globe to prevent the observation of the interior of said globe from without.

Signed at Rochester, New York, this 29th day of May, 1928.

ANDREW LUDWIG.